United States Patent [19]

Hashimoto

[11] Patent Number: 4,660,218
[45] Date of Patent: Apr. 21, 1987

[54] APPARATUS FOR SWITCHING TELEPHONE LINE A RESPONSE DEVICE, A DATA TERMINAL OR A TELEPHONE

[75] Inventor: Kazuo Hashimoto, Tokyo, Japan
[73] Assignee: Hashimoto Corporation, Tokyo, Japan
[21] Appl. No.: 711,677
[22] Filed: Mar. 14, 1985
[30] Foreign Application Priority Data Mar. 14, 1984 [JP] Japan .................. 59-48352

[51] Int. Cl.⁴ .......................................... H04M 11/00
[52] U.S. Cl. .......................................... 379/93; 379/82
[58] Field of Search ............... 179/2 A, 2 AM, 2 C, 179/2 DP, 6.13, 6.16, 84 C

[56] References Cited

U.S. PATENT DOCUMENTS

| | | | |
|---|---|---|---|
| 4,059,727 | 11/1977 | Kingswell | 179/2 AM |
| 4,345,113 | 8/1982 | Shelley | 179/2 A |
| 4,387,272 | 6/1983 | Castro et al. | 179/6.16 X |
| 4,394,540 | 7/1983 | Willis et al. | 179/2 AM |
| 4,444,999 | 4/1984 | Sparrevohn | 179/2 DP X |
| 4,469,917 | 9/1984 | Shelley | 179/2 DP |
| 4,488,005 | 12/1984 | Frantz | 179/84 C X |
| 4,503,288 | 3/1985 | Kessler | 179/2 DP |
| 4,524,244 | 6/1985 | Faggin et al. | 179/2 DP |
| 4,549,045 | 10/1985 | Castro et al. | 179/6.13 X |
| 4,556,761 | 12/1985 | Hashimoto | 179/6.13 X |
| 4,584,434 | 4/1986 | Hashimoto | 179/2 A |
| 4,596,021 | 6/1986 | Carter et al. | 179/2 DP X |
| 4,598,179 | 7/1986 | Clark et al. | 179/84 C |

Primary Examiner—Keith E. George
Attorney, Agent, or Firm—Lowe Price Leblanc Becker & Shur

[57] ABSTRACT

A switching apparatus is proposed which automatically switches between a telephone set connected to a telephone line and a terminal device for data communication in accordance with a signal sent through the telephone line. When an incoming call signal is detected, the telephone lines are engaged with the telephone set, and a response signal is sent out onto the telephone line. Thereafter, when a control signal or the like is received by the switching apparatus, the terminal device is automatically engaged with the telephone line. When the control signal is not sent to the switching apparatus, the called party can communicate with the calling party when the telephone set is set in the off-hook state.

9 Claims, 3 Drawing Figures

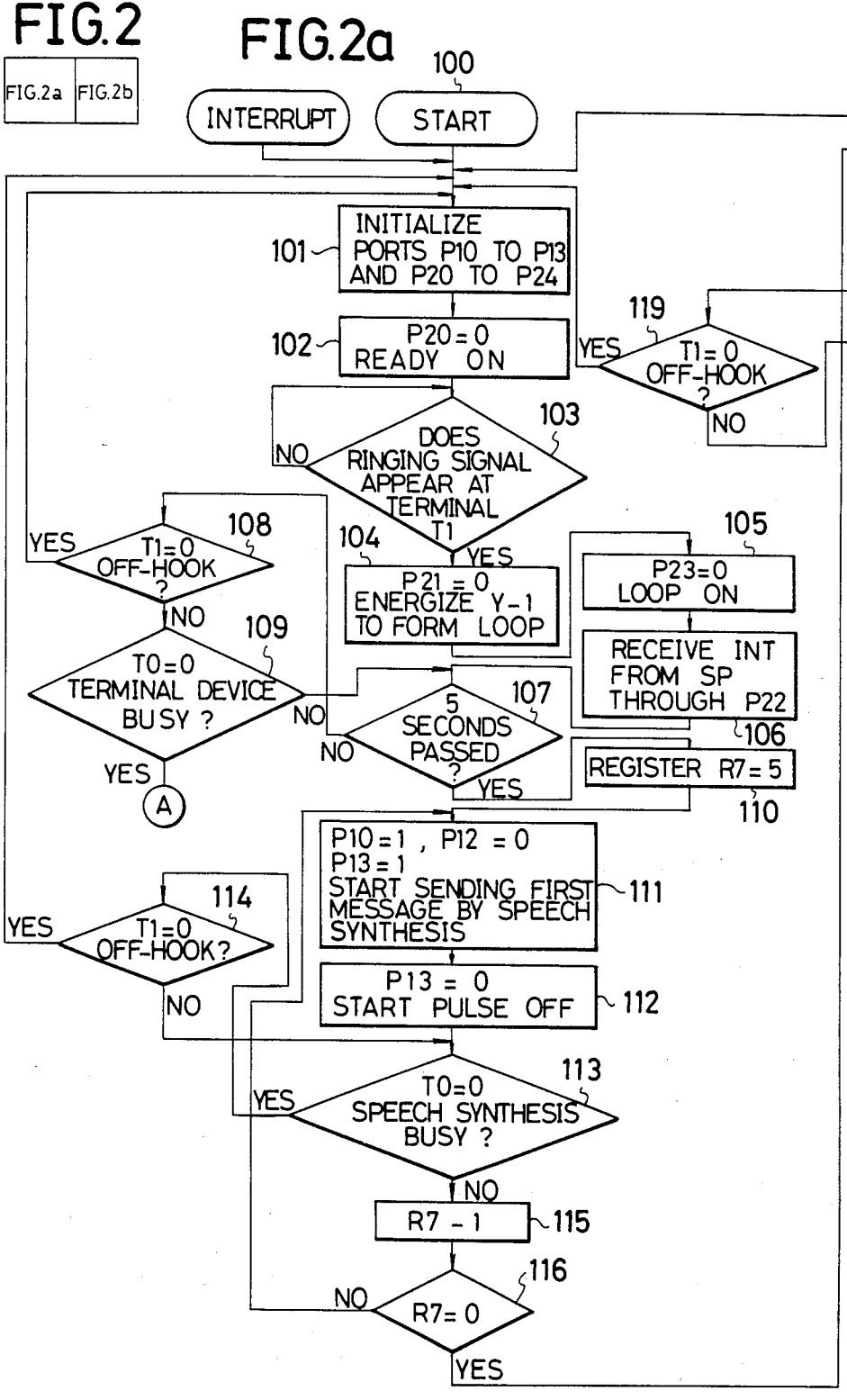

4,660,218

APPARATUS FOR SWITCHING TELEPHONE LINE A RESPONSE DEVICE, A DATA TERMINAL OR A TELEPHONE

BACKGROUND OF THE INVENTION

1. Field of the Invention

The present invention relates to a switching apparatus for selectively coupling a terminal device such as a facsimile system or a modem to a telephone set connected to a telephone line in response to a signal sent through the telephone line, thereby causing the terminal device to automatically communicate with a sending end.

2. Description of the Prior Art

Telephone lines are used for speech communication by means of telephone sets and data communication by means of a terminal device such as a facsimile system or a modem connected to the telephone lines. When a telephone set and a terminal device are connected in parallel to a single telephone line, a ringing signal cannot be differentiated as a ringing signal for speech communication with the telephone set or as a signal for data communication with the terminal device. For this reason, conventionally, a called party answers the telephone and manually couples the telephone line to the terminal device so as to perform data communication, or the terminal device is automatically coupled to the telephone line upon reception of the ringing signal. When the telephone line is automatically coupled to the terminal device upon reception of the ringing signal, the calling party cannot perform speech communication with the called party even if the calling party wishes to communicate since the telephone line is automatically coupled to the terminal device. In this manner, the telephone line connected to the terminal device can be used only for data communication.

SUMMARY OF THE INVENTION

It is a first object of the present invention to provide a switching apparatus for a telephone line, wherein information sent from a calling party can be detected as telephone information or non-telephone information and the telephone line is automatically connected to either a terminal device or a telephone in accordance with the detection result.

It is a second object of the present invention to provide a switching apparatus for a telephone line, which is temporarily engaged with the telephone line upon reception of an incoming call, which determines whether the incoming call is speech or data communication in accordance with the presence/absence of a control or carrier signal to be described later, which waits while a response signal is being sent out after a predetermined time interval has elapsed when the incoming call is determined to be for speech communication, and which couples the terminal device to the telephone line in response to the control or carrier signal sent through the telephone line when the incoming call is determined to be for data communication.

The terminal device which adapts the switching apparatus of the present invention can be automatically engaged with the telephone line in response to the carrier or control signal sent through the telephone line. The switching apparatus of the present invention selectively switches between the terminal device and the telephone set and couples either the terminal device or the telephone set to the telephone line. The switching apparatus comprises: a connector for connecting the telephone line to the telephone set; incoming call signal detecting means for detecting an incoming call sent through the telephone line; engaging means, constituting an engaging circuit in response to an incoming call signal detection output from said incoming call signal detecting means, for supplying the carrier or control signal from the telephone line to the terminal device; means for sending a response signal to the telephone line while the engaging circuit is constituted by the engaging means; off-hook detecting means for detecting an off-hook state of the telephone set; terminal device operation detecting means for detecting an operation of the terminal device; means for cancelling the engaging circuit of said engaging means in response to a detection output from said off-hook detecting means; and means for cancelling the engaging circuit of said engaging means and disabling the connector in response to a detection output from the terminal device operation detecting means.

According to the present invention, when the incoming call signal detecting means detects an incoming call, the engaging circuit of the engaging means is formed. Thereafter, when the control signal is received by the apparatus, the terminal device is engaged with the telephone line to start data communication. When the control signal is not received, i.e., when speech communication is required, the called party picks up the handset of the telephone set, thereby communicating with the calling party. When the terminal device or the telephone set is engaged with the telephone line, the engaging circuit of the engaging means is cancelled. At the same time, when the terminal device is connected to the telephone line, the connector is turned off to disengage the telephone set from the telephone line, thereby preventing interference to data communication which is caused by an off-hook operation of the telephone set.

Furthermore, according to the present invention, a speech synthesis circuit or a tape recorder is operated to send a response signal such as an outgoing message until the engaging circuit of the engaging means is cancelled after it is formed. In addition, an incoming message from the calling party can also be recorded.

While the off-hook signal is generated from the telephone set or the terminal device is started after the engaging circuit of the engaging means is formed, an alarm can be generated by an additional alarm generator.

With the arrangement and functions described above according to the present invention, data communication is performed upon operation of the terminal device or speech communication is performed as an automatic telephone answering apparatus for sending an outgoing message to the calling party when the called party is out. The above operations are automatically switched in accordance with the type of information sent through the telephone line.

DETAILED DESCRIPTION OF THE PREFERRED EMBODIMENT

Figure 1:
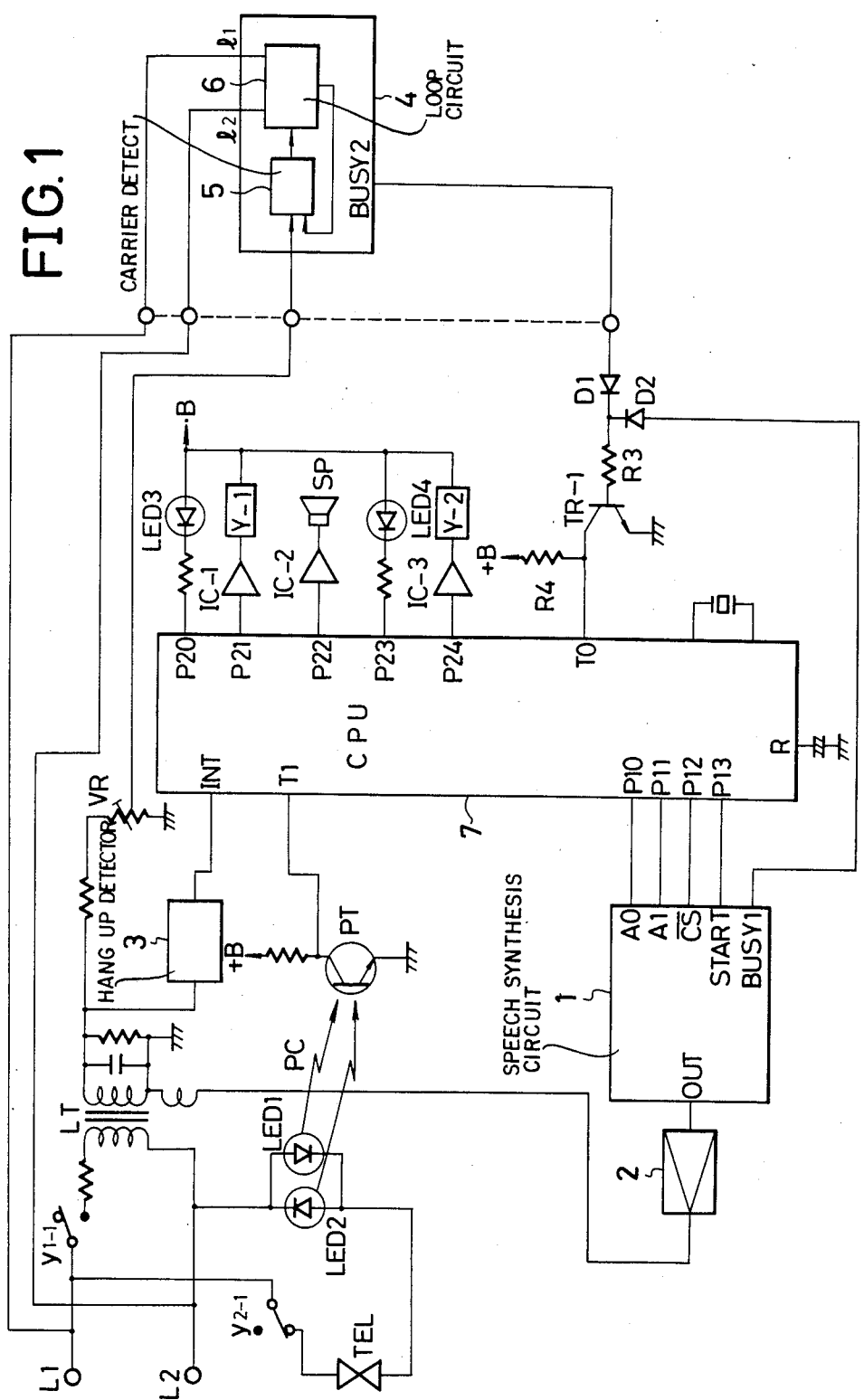
FIG. 1 is a circuit diagram showing the main part of a switching apparatus according to an embodiment of the present invention.

Referring to FIG. 1, reference symbols L1 and L2 denote telephone lines; TEL, a telephone set; LT, a line transformer; and PC, a photocoupler consisting of light-emitting diodes LED1 and LED2 and a phototransistor PT. In this embodiment, the photocoupler PC constitutes an incoming signal detecting means and an off-hook detecting means. Reference numeral 7 denotes a microprocessor (to be referred to as a CPU hereinafter). In this embodiment, the CPU 7 comprises a CPU 8748 available from Intel Corp., U.S.A. Reference symbols P10 to P13 and P20 to P24 denote output ports, respectively; T1, a terminal for detecting the ringing signal and the off-hook state of the telephone set TEL; and T0, a busy test terminal for a speech synthesis circuit 1 and a terminal device 4. The speech synthesis circuit 1 comprises a speech synthesis IC. When a pulse of H level is applied to a terminal START while a chip enable terminal CS and input terminals A0 and A1 are set at L level, H level and H level, respectively, a first synthesized message "Please wait" is generated from an output terminal OUT. However, when the input terminals A0 and A1 are set at L level and H level, a second message "He (she) is out. Please call him (her) back later" is generated. Reference numeral 2 denotes an amplifier; and 3, a hang-up detector for detecting a pulse sent to the telephone line when the calling party hangs up the telephone. Reference symbol LED3 denotes a light-emitting diode which is turned on when the switching apparatus is set in the wait mode; LED4, a light-emitting diode which is turned on when the switching apparatus is held in the engaging state; and Y-1, an engaging relay for the engaging means. The relay Y-1 has a contact y2-1 as the connector for connecting the telephone lines L1 and L2 to the telephone set TEL and is energized upon operation of the terminal device 4 to disengage the telephone set TEL from the telephone lines L1 and L2 through the contact y2-1. Reference symbols IC-1 to IC-3 denote driver ICs, respectively; TR-1, a transistor; and D1 and D2, diodes, respectively. The transistor TR-1 and the diode D1 constitute a terminal device operation detecting means in this embodiment.

The terminal device 4 comprises, for example, a modem or a facsimile system. Only the main part of the terminal device 4 which is associated with the present invention is illustrated. Reference numeral 5 denotes a carrier detector for starting or holding the terminal device 4 in the operative state; and 6, a loop circuit for looping the telephone lines L1 and L2 in response to the output from the carrier detector 5. The carrier signal is supplied to the carrier detector 5 through the loop forming circuit 6.

Figure 2B:
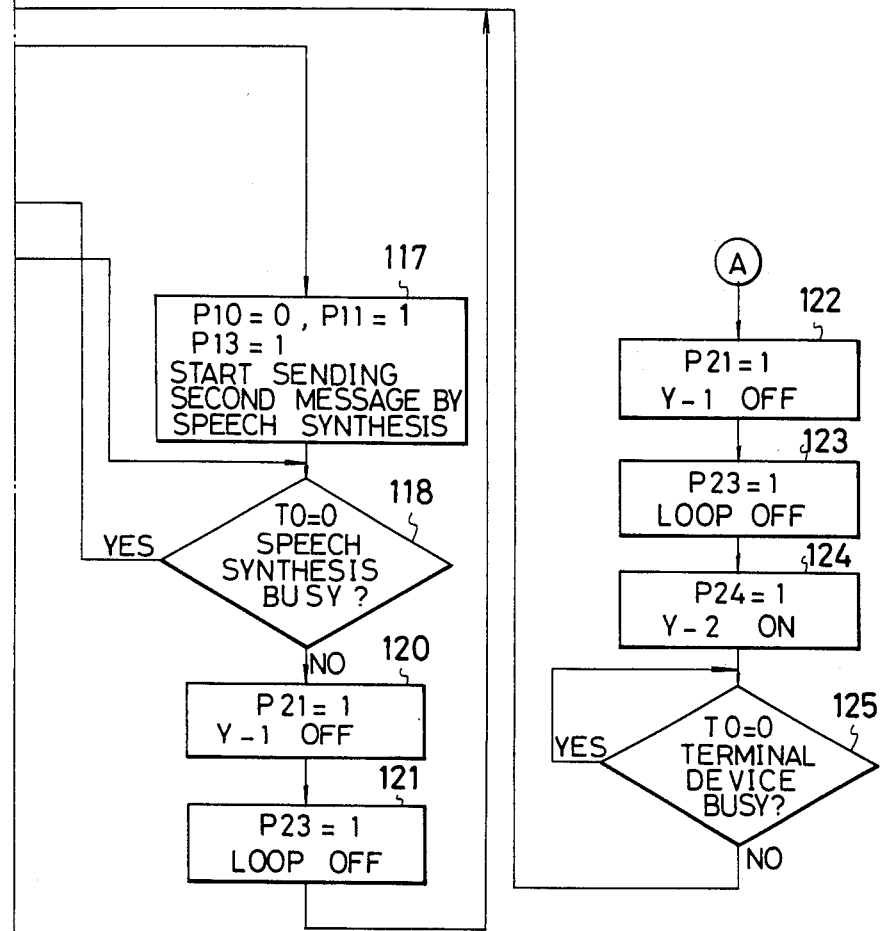
FIG. 2 (formed of FIGS. 2A and 2B) is a flow chart for explaining the operation of a program CPU.

The switching circuit of this embodiment has the above arrangement, and the operation thereof will be described in detail with reference to a flow chart of FIG. 2.

When a power switch is turned on, the flow advances from step 100 to step 101. In step 101, the output ports P10 to P13 and P20 to P24 are initialized to disable the speech synthesis circuit 1, the driver IC IC-1, the relay Y-1 and a relay Y-2 which are loads of these ports. In step 102, the port P20 is set at L level (i.e., logic "0"), and the load light-emitting diode LED3 is turned on to indicate that the switching apparatus is set in the ready state. In step 103, the CPU 7 receives a ringing signal from the photocoupler PC as the incoming call signal detecting means through the terminal T1. When the ringing signal is received through the telephone lines L1 and L2, the light-emitting diodes LED1 and LED2 of the photocoupler PC are alternately turned on through the contact y2-1 as the connector and the telephone set TEL, so that the ringing signal is received by the photocoupler PC. The signal fetched by the CPU 7 through the terminal T1 is determined as the ringing signal in accordance with the program, the flow advances to step 104. In step 104, the output port P21 is set at L level, and the relay Y-1 is rendered operative through the driver IC IC-1. The telephone lines are kept looped through the contact y1-1 and the line transformer LT.

In step 105, the output port P23 is set at L level to turn on the light-emitting diode LED4, thereby indicating the telephone lines are being looped.

In step 106, an INT derived from the program is produced at a loudspeaker SP through the output port P22 and the driver IC IC-2. In this manner, a party near the telephone set can recognize that an incoming call was received even after the ringing tones are stopped. The CPU 7 checks in step 107 whether or not 5 seconds have elapsed after the telephone lines are looped. If NO in step 107, the flow advances to step 108 to determine whether or not the telephone set TEL is off-hooked. The determination in step 108 is performed by the photocoupler PC serving as the off-hook detecting means. If NO in step 108, the flow advances to step 109 to determine whether or not the terminal device 4 was started in response to the carrier or control signal sent from the calling party and is enabled. This test is made by supplying a signal from the transistor TR1 as the terminal device operation detecting means to the terminal T0 of the CPU 7. When the telephone set TEL is off-hooked, the light-emitting diode LED1 or LED2 is continuously turned on in accordance with the polarity of the telephone lines L1 and L2. The operation of the light-emitting diode LED1 or LED2 is detected by the program through the terminal T1. The flow returns to step 101, and the switching apparatus is set in the waiting state. However, when the carrier or control signal is not sent within 5 seconds, the flow advances from step 107 to step 110. In step 110, let the content of a counter register R7 be "5". In step 111, the output ports P10, P12 and P13 are set at H level, L level and H level, respectively, to select the terminal input A0 of the speech synthesis circuit 1 which receives the start pulse. The speech synthesis circuit 1 then generates the first message "Please wait" from the output terminal OUT. The first message is amplified by the amplifier 2 and is sent out to the telephone lines L1 and L2 through the line transformer LT. The amplified message is received by the calling party.

In step 112, the start pulse is disabled. In step 113, the CPU 7 checks whether or not the output from the speech synthesis circuit 1 is busy.

The output terminal OUT of the speech synthesis circuit 1 is set to busy while the first message is being sent out. Since the terminal BUSY1 of the speech synthesis circuit 1 is set at H level, the transistor TR-1 is turned on through the diode D2 and a resistor R3, and the terminal T0 is set at L level. Meanwhile, the INT in step 106 is amplified and produced at the loudspeaker SP. When the called party hears the INT and unhooks the telephone set TEL, the flow returns to step 101 through step 114, so that the switching apparatus is set in the waiting state. In this state, the called party can directly communicate with the calling party through the corresponding telephone sets. When the called party does not unhook the telephone set TEL, the register R7 is decremented by one in step 115 after the first message is completely sent for the first time. In step 116, the first message is repeatedly sent five times until the content of the register R7 is decremented to zero. When the first message is sent five times, the flow advances to step 117. The terminal A0 of the speech synthesis circuit 1 is set at L level, and the terminal A1 thereof is set at H level. In this case, the second message "He (she) is out. Please call him (her) back later" is sent. In order to send out this message, a write pulse is supplied to the speech synthesis circuit 1. The CPU 7 checks in step 118 whether or not the second message is completed. Even during this period, in step 119, the off-hook state of the telephone set TEL can be detected. When the second message is completely sent out, the relay Y-1 is deenergized to cancel the loop in step 120. In step 121, the light-emitting diode LED4 is turned off. The flow returns to step 101, and the switching apparatus is then set in the waiting state.

In step 109, when the carrier or control signal is sent from the calling party, the signal is detected by the carrier detector 5 through the line transformer LT and a potentiometer VR. The output from the carrier detector 5 loops the telephone lines L1 and L2. However, since the loop is already formed by the relay Y-1 in step 104, the flow advances from step 109 to step 122, thereby cancelling the loop formed by the relay Y-1. The light-emitting diode LED4 is turned off in step 123, and at step 124 the output port P24 is set at H level to keep energizing the relay Y-2. The telephone set TEL is disengaged from the telephone lines L1 and L2 through the contact y2-1. This is because the data is disturbed when the telephone set TEL is unhooked while the terminal device 4 is being operated. In accordance with the program the CPU 7 checks in step 125 whether or not the terminal device 4 is busy through the terminal BUSY2, the diode D1, the resistor R3, the transistor TR-1 and the terminal T0. After the loop is formed by the loop forming circuit 6, the modulated signal is supplied to the carrier detector 5. When a predetermined period of time has elapsed after data exchange is completed and the carrier disappears, the relay in the loop circuit is reengaged. In addition, when the busy terminal BUSY2 is set at L level, the flow returns from step 125 to step 101. In step 101, when the ports P10 to P13 and P20 to P24 are initialized, the relay Y-2 is deenergized and the switching apparatus is completely set in the waiting state. Since the terminal device 4 is not directly associated with the present invention, its function is schematically described within the limits of the prior art.

According to the present invention, when the incoming signal is received from the telephone lines, the loop circuit is temporarily formed upon ringing. Thereafter, when the incoming call represents speech communication during a short silent interval, the preset outgoing message is sent to the calling party and the reception of the incoming call is signalled to a party near the telephone set. At the same time, when the called party answers the telephone within a predetermined period of time, the called party can communicate with the calling party. However, when the the carrier or control signal represents data communication during the short silent interval, the circuit of the telephone set is disengaged from the telephone line. At the same time, a non-telephone additional device such as a facsimile system or computer is engaged with the telephone line. When communication between the sending and receiving terminal devices is started and then ended, the switching apparatus can be set in the initial state. In addition, in the above embodiment, when the incoming call is received and the off-hook state is not obtained within a predetermined period, the first outgoing message is generated from the speech synthesis circuit. Thereafter, the second outgoing message is generated from the speech synthesis circuit, thereby cancelling the loop. The first and second outgoing messages can be reproduced from a recording tape mounted in the conventional automatic telephone answering apparatus instead of using the speech synthesis circuit. In addition, after a recording unit is operated to record an incoming message from the calling party, the loop can be cancelled to set the switching apparatus in the initial waiting state.

What is claimed is:

1. A switching apparatus for automatically swtiching a connection between a telephone set and a telephone line or between said telephone line and a terminal device which forms a data loop circuit upon reception of a carrier signal sent through said telephone line and performs data communication, said telephone set being connected in parallel with said terminal device with respect to said telephone line, comprising:
a connector for selectively connecting said telephone line to said telephone set;
incoming call signal detecting means for detecting an incoming call signal sent through said telephone line;
looping means for forming a response loop circuit in response to an incoming signal detection output from said incoming call signal detecting means and for supplying the carrier signal from said telephone line to said terminal device;
off-hook detecting means for detecting an off-hook state of said telephone set;
means responsive to formation of said response loop circuit for sending out a repeating speech response message over said telephone line until said response loop circuit of said looping means is cancelled;
terminal device operation detecting means for detecting operation of said terminal device;
means for cancelling said response loop circuit of said looping means in response to a detection output from said off-hook detecting means; and
means for cancelling the response loop circuit of said looping means and triggering said connector to disconnect said telephone set from said telephone line in response to a detection output from said terminal device operation detecting means.

2. An apparatus according to claim 1, wherein said means for sending out a response signal comprises speech synthesizing means for synthesizing an outgoing message.

3. An apparatus according to claim 1, wherein said looping means comprises an alarm generator for generating an alarm sound until the loop circuit is cancelled.

4. An apparatus according to claim 1, wherein a second response message is sent out onto said telephone line when the number of repetitions of said repeating response message exceeds a predetermined number, and after sending said second response message cancelling the response loop circuit of said looping means.

5. An apparatus according to claim 2, wherein another response signal is sent out onto said telephone line and a recording unit is driven to record an incoming message from a calling party when the number of repetitions of said response signal exceeds a predetermined number of times.

6. A switching apparatus for automatically switching a connection between a telephone set and a telephone line or between said telephone line and a terminal device which forms a data loop circuit upon reception of a carrier signal sent through said telephone line and performs data communication, said telephone set being connected in parallel with said terminal device with respect to said telephone line, comprising:
- a connector for selectively connecting said telephone line to said telephone set;
- incoming call signal detecting means for detecting an incoming call signal sent through said telephone line;
- looping means for forming a response loop circuit in response to an incoming signal detection output from said incoming call signal detecting means and for supplying a carrier or control signal received from said telephone line to said terminal device, said terminal device including means for forming said data loop in parallel with said response loop circuit and for receiving data from said telephone line;
- off-hook detecting means for detecting an off-hook state of said telephone set;
- means responsive to formation of said response loop circuit for sending out a repeating speech response message over said telephone line for conveying information to a calling party until said response loop circuit of said looping means is cancelled;
- terminal device operation detecting means for detecting operation of said terminal device;
- means for cancelling said response loop circuit of said looping means in response to a detection output from said off-hook detecting means; and
- means for cancelling the response loop circuit of said looping means and triggering said connector to disconnect said telephone set from said telephone line in response to a detection output from said terminal device operation detecting means.

7. An apparatus according to claim 6, wherein a second response message is sent out onto said telephone line when the number of repetitions of said repeating response message exceeds a predetermined number, and after sending the second response message cancelling the response loop circuit of said looping means.

8. A switching apparatus for automatically switching a connection between a telephone set and a telephone line or between said telephone line and a terminal device which forms a data loop circuit upon reception of a carrier signal sent through said telephone line and performs data communication, said telephone set being connected in parallel with said terminal device with respect to said telephone line, comprising:
- a connector for selectively connecting said telephone line to said telephone set;
- incoming call signal detecting means for detecting an incoming call signal sent through said telephone line;
- looping means for forming a response loop circuit in response to an incoming signal detection output from said incoming call signal detecting means and for supplying the carrier signal from said telephone line to said terminal device;
- off-hook detecting means for detecting an off-hook state of said telephone set;
- means for sending out a repeating first response signal to said telephone line after engaging the telephon line by said looping means;
- terminal device operation detecting means for detecting operation of said terminal device;
- means for cancelling said response loop circuit of said looping means in response to a detection output from said off-hook detecting means; and
- means for cancelling the response loop circuit of said looping means and triggering said connector to disconnect said telephone set from said telephone line in response to a detection output from said terminal device operation detecting means,
- said means for sending operable for further sending out a second response signal onto said telephone line when the number of repetitions of said first response signal exceeds a predetermined number, and after sending said second response signal cancelling the response loop circuit of said looping means.

9. A switching apparatus as recited in claim 8 wherein said means for sending comprises means for sending first and second different voice messages to the calling party.

* * * * *